US009483075B2

(12) United States Patent
Liniger

(10) Patent No.: US 9,483,075 B2
(45) Date of Patent: Nov. 1, 2016

(54) HANDHELD MOUNT AND STAND ASSEMBLY FOR PORTABLE ELECTRONIC DEVICES

(71) Applicant: Paul Liniger, Portland, OR (US)

(72) Inventor: Paul Liniger, Portland, OR (US)

( * ) Notice: Subject to any disclaimer, the term of this patent is extended or adjusted under 35 U.S.C. 154(b) by 155 days.

(21) Appl. No.: 14/261,201

(22) Filed: Apr. 24, 2014

(65) Prior Publication Data

US 2014/0340839 A1 Nov. 20, 2014

Related U.S. Application Data

(60) Provisional application No. 61/823,003, filed on May 14, 2013.

(51) Int. Cl.
*F16B 47/00* (2006.01)
*G06F 1/16* (2006.01)
*F16M 13/02* (2006.01)
*B60R 11/00* (2006.01)

(52) U.S. Cl.
CPC ............. *G06F 1/1632* (2013.01); *F16B 47/00* (2013.01); *F16M 13/02* (2013.01); *B60R 2011/0056* (2013.01); *B60R 2011/0068* (2013.01)

(58) Field of Classification Search
CPC ........... B60R 11/02; B60R 2011/0056; B60R 2011/0068; B65D 25/22; F16M 13/02; F16B 47/00; G06F 1/1632
USPC ......... 248/205.5, 205.7, 205.8, 206.1, 206.2, 248/127, 176.1, 177.1; 361/679.43, 679, 2; 396/55, 421; 224/275; 206/525, 577
See application file for complete search history.

(56) References Cited

U.S. PATENT DOCUMENTS

| | | | | |
|---|---|---|---|---|
| 3,020,017 A * | 2/1962 | Watson | ................ | A61G 13/12 248/205.8 |
| 4,640,481 A * | 2/1987 | Kohno | ................ | F16M 11/00 248/126 |
| 5,028,026 A * | 7/1991 | Philipps | ................ | A47G 7/044 248/206.1 |
| 5,098,182 A * | 3/1992 | Brown | ................ | F16M 13/04 224/908 |
| 5,207,791 A * | 5/1993 | Scherbarth | ............. | A63F 13/08 224/270 |
| 7,021,593 B1 * | 4/2006 | Fan | ........................ | F16B 47/00 248/206.2 |
| 7,431,250 B2 * | 10/2008 | Chen | ...................... | F16B 47/00 248/205.5 |
| 7,789,357 B2 * | 9/2010 | Richter | ..................... | F16B 2/14 248/160 |
| 8,302,920 B2 * | 11/2012 | Tsai | ....................... | F16B 47/00 248/205.5 |
| 8,967,561 B2 * | 3/2015 | Cheng | .................. | F16M 11/041 248/176.1 |
| 2007/0120026 A1 * | 5/2007 | Chen | ....................... | F16B 47/00 248/205.5 |
| 2007/0177866 A1 * | 8/2007 | Fujimoto | .............. | G03B 29/00 396/376 |
| 2009/0108151 A1 * | 4/2009 | Carnevali | .............. | F16B 47/00 248/205.3 |
| 2010/0116954 A1 * | 5/2010 | Fan | ....................... | F16B 47/006 248/205.8 |
| 2011/0297804 A1 * | 12/2011 | Fan | ....................... | F16B 47/006 248/206.2 |
| 2014/0054338 A1 * | 2/2014 | Casagrande | ............ | B60R 11/02 224/275 |

* cited by examiner

*Primary Examiner* — Anita M King
(74) *Attorney, Agent, or Firm* — Mark S Hubert

(57) ABSTRACT

A handheld mount assembly for portable electronic device includes a pistol style grip and suction cup assembly. The mount assembly functions as a gripping device for handheld use, a hands free stand, and a recharging station. The mount can be secured anywhere on the back of the electronic device, making the angle adjustable for stand use, and also allowing the user to position the device differently to accommodate his/her own needs. The mount can be secured to any planar, smooth surface including plates or trays providing a more stable and maneuverable option for eating without a table or carrying large trays.

8 Claims, 6 Drawing Sheets

FIG. 5
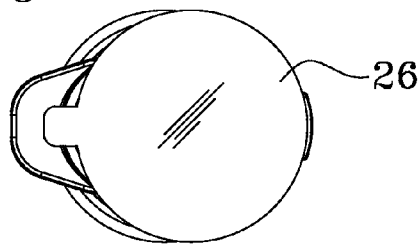
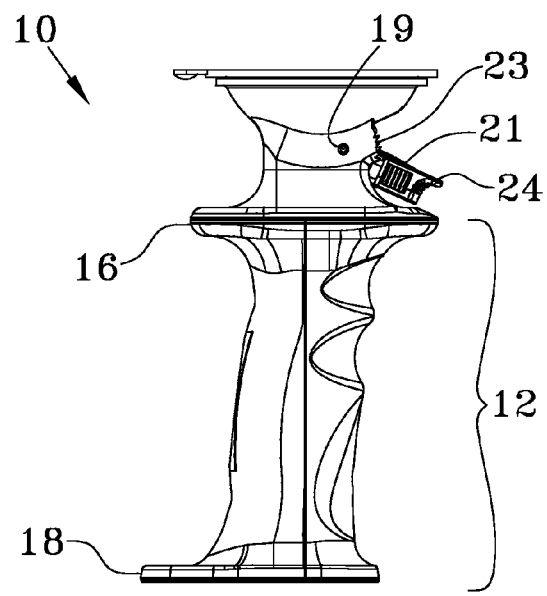
FIG. 6
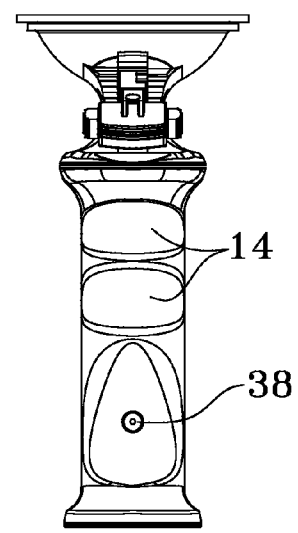
FIG. 7

HANDHELD MOUNT AND STAND ASSEMBLY FOR PORTABLE ELECTRONIC DEVICES

This application claims the benefit of U.S. Provisional Patent Application No. 61/823,003 filed May 14, 2013 and under 35 U.S.C. §120 claims the benefit thereof.

BACKGROUND OF THE INVENTION

Numerous ways of mounting tablet/pad computers and smart phone devices such as: the Samsung Galaxy® product line, Iphones®, Ipads®, Ipods®, Kindles®, similar e-book readers, and similar portable electronic/multi-media devices are well know. However, several limitations exist for known mounts. Often it is impossible to alter the orientation of the device (that is go from portrait to landscape or landscape to portrait) for ease of viewing, are cumbersome, and the attachment point of the mount is fixed typically in the center of the portable multi-media device. Additionally, mounts that are designed as "handheld" will not double as a "hands free" stand.

SUMMARY OF THE INVENTION

The handheld mount assembly of the present invention is an ergonomic convenience aid for easily holding, standing, positioning, and handling portable electronic devices, as well as any light household items with flat smooth mounting surfaces. The assembly includes rechargeable batteries and can charge/power the electronic devices it is designed to hold.

The mount assembly also doubles as a stand for hands free use, and provides different angles by simply rotating the electronic device it is attached to. The handheld mount assembly can also be easily positioned in different places on an object to support even more creative sustained use; for example, offsetting the mount's connection point to balance part of the device on the user's arm while drawing or writing with a stylus. A pistol style grip on the handheld mount assembly allows for longer and more comfortable use while lying in bed, reading, or watching movies. It reduces the strain on hands and wrists by allowing the use of larger muscle groups. The handheld mount assembly design also supports a more stable application for lap viewing or reading—the user does not even need to hold the mount assembly, as the mount assembly acts as a counter balance contacting the user's leg or stomach, while the user holds the multi-media device (or even laptop) to which the mount is attached. The handheld mount assembly of the present invention also allows for simplified transport of multi-media devices from one room to another and will function as a hands free stand on soft and hard surfaces, and since the handheld mount assembly of the present invention can be secured at any point on the back of the multi-media device the angle at which the devices rests (or stands) on a surface is adjustable.

The handheld mount assembly of the present invention can also be secured to a dinner plate, making eating without a table simpler. The handheld mount assembly of the present invention provides a much more stable and maneuverable option for people caring plates around a party or for servers carrying large trays of food, and can be used to install hard surface construction material such as laminate, plastic, and glass.

Finally the assembly includes a recessed ¼" thread to accommodate a standard tripod mount within the base of the pistol grip. A camera or video recorder can easily be attached to the base allowing the user to maintain a steady grip on his/her camera or video recorder. Users are not limited to just attaching cameras or video recorders, but can attach anything with a ¼" bolt—for example, a pivotal suction cup mount.

BRIEF DESCRIPTION OF THE DRAWINGS

FIG. 5 is a top view of the first embodiment of handheld mount assembly of the present invention;

FIG. 6 is a right-side view of the first embodiment handheld mount assembly of the present invention; and FIG. 7 is a rear view of a first embodiment handheld mount assembly of the present invention;

DETAILED DESCRIPTION

Figure 1:
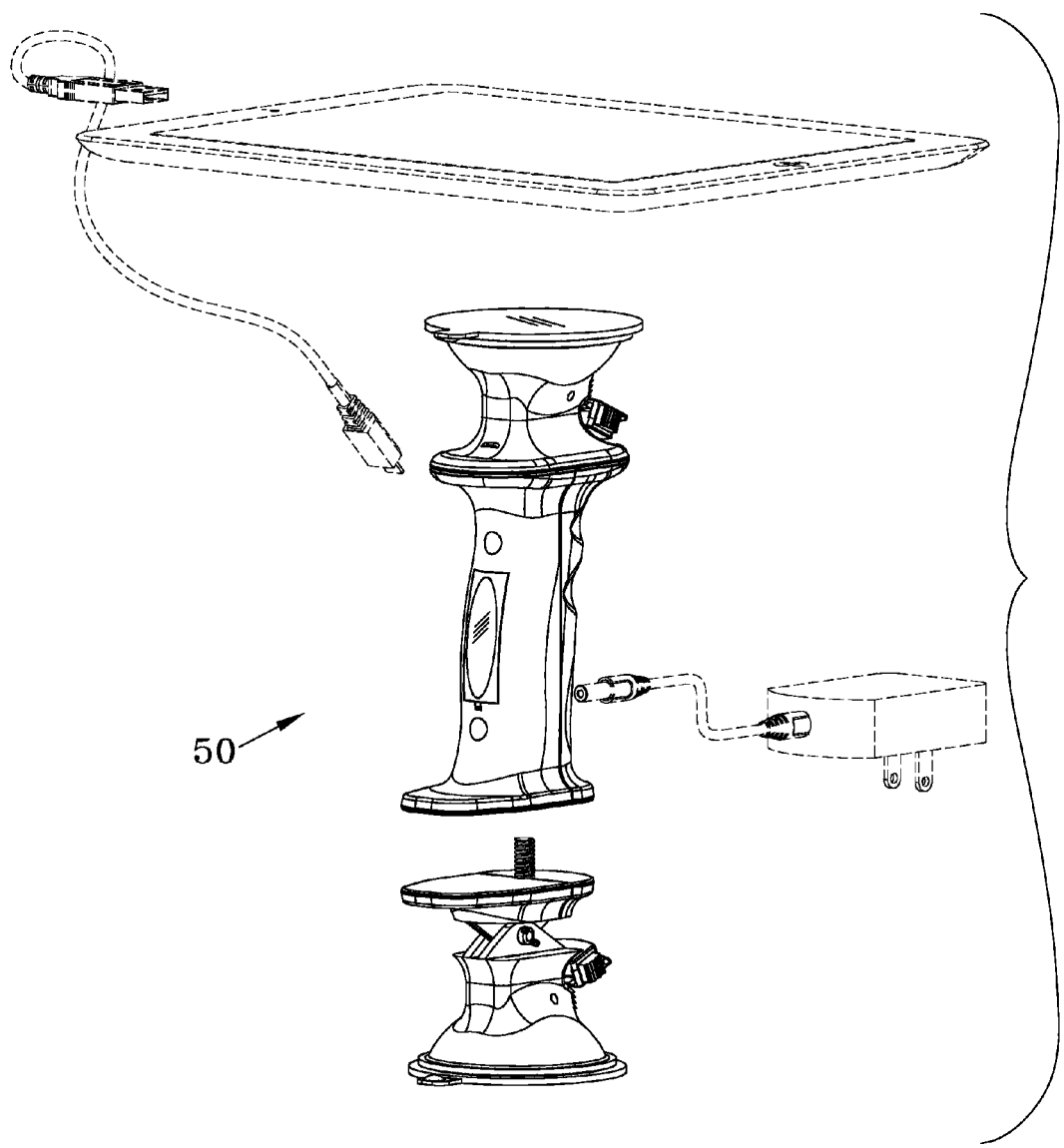
FIG. 1 is an exploded perspective view of a second embodiment of the handheld mount assembly of the present invention illustrating a wall charger attachment and a portable electronic device.
Figure 2:
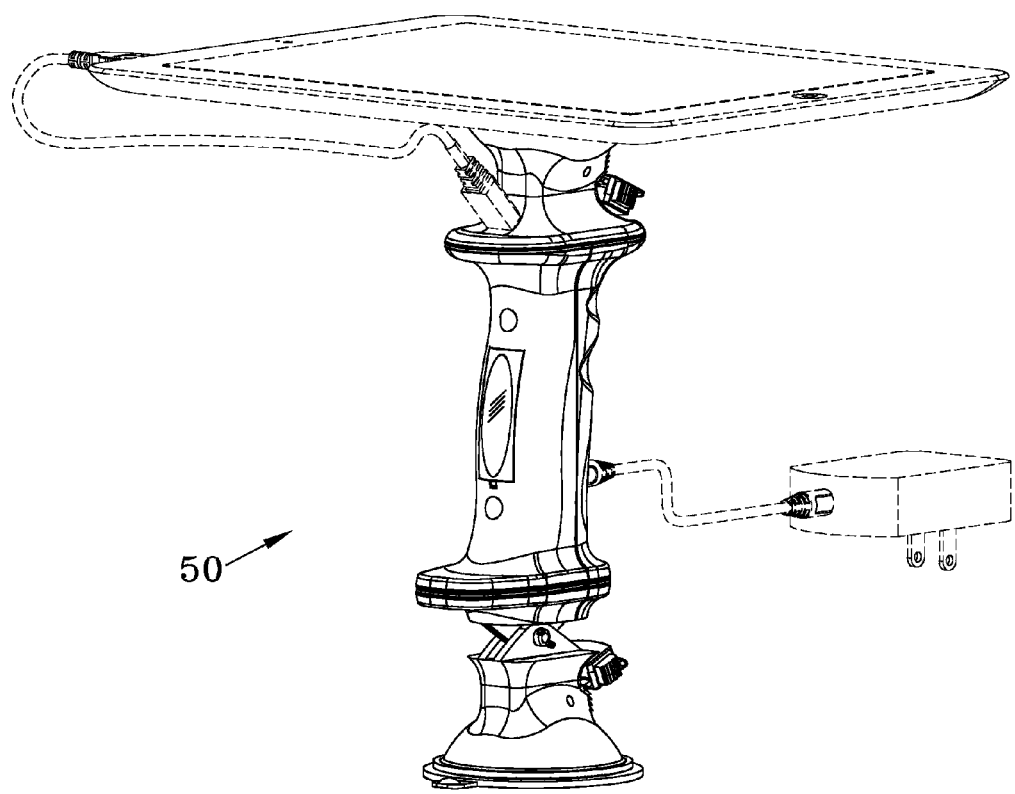
FIG. 2 is a perspective view of a second embodiment of the handheld mount assembly of the present invention attached to a wall charger and a portable electronic device.
Figure 8:
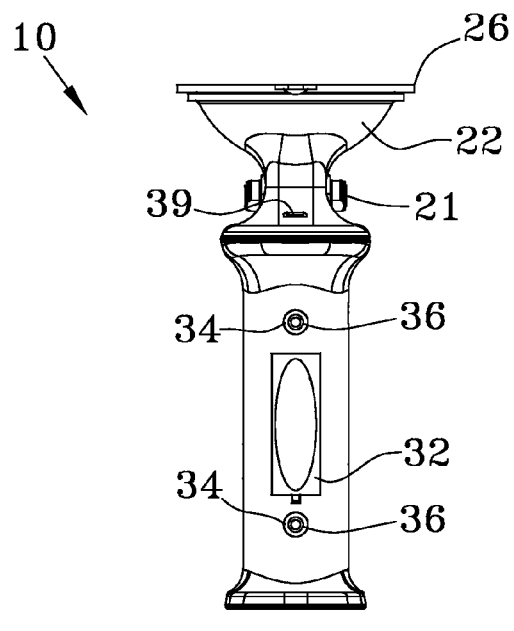
FIG. 8 is a front view of a first embodiment handheld mount assembly of the present invention.
Figure 9:
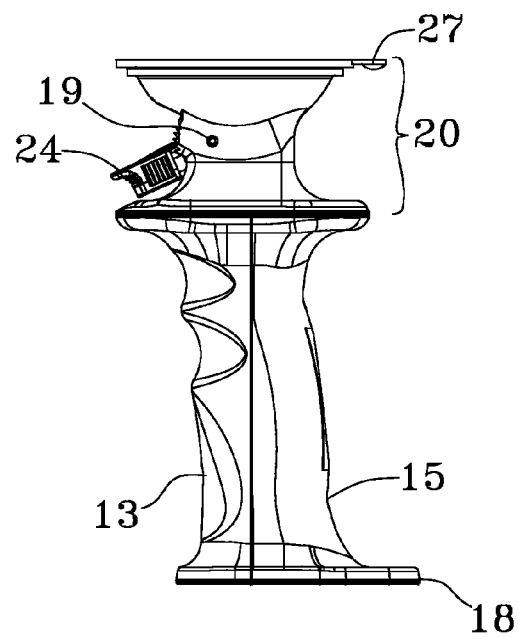
FIG. 9 is a left-side view of the first embodiment handheld mount assembly of the present invention.
Figure 10:
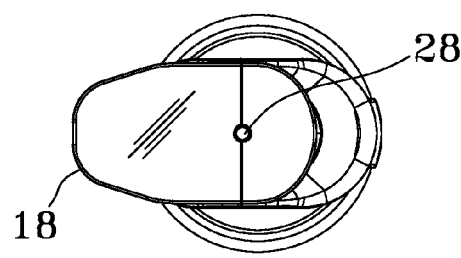
FIG. 10 is a bottom view of the first embodiment handheld mount assembly of the present invention.

Looking at FIGS. 5-11 it can be seen that the first embodiment of the handheld mount assembly 10 includes a pistol grip assembly 12 that accommodates a user's hand in a first configuration. Grip assembly 12 accommodates both left and right-hand gripping with ergonomically correct finger grooves 14, a rear upper extension 16 for supporting the web of the hand, and a flat base 18. Visible in FIG. 10 is connection orifice 28, which is a recessed ¼" threaded orifice designed to accommodate a standard tripod mount as is well known in the art. Grip assembly 12 comprises a first section 13 and second section 15 which have been matingly connected via two screws 36, which pass through access orifices 34. Should a user need or want to access the interior electrical components of grip assembly 12, he or she would simply remove (unscrew) screws 36. Electrical terminal 38 is visible in FIG. 7 and provides for secure connection to a wall charger as illustrated in FIGS. 1 & 2.

Figure 11:
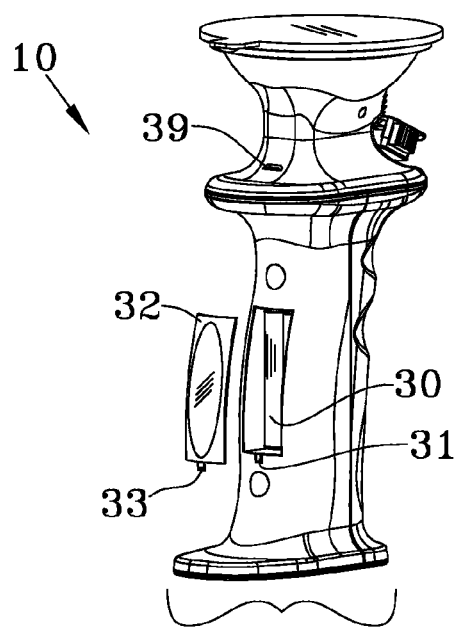
FIG. 11 is a back exploded perspective view of the first embodiment handheld mount assembly of the present invention with the battery access lid removed.
Figure 12:
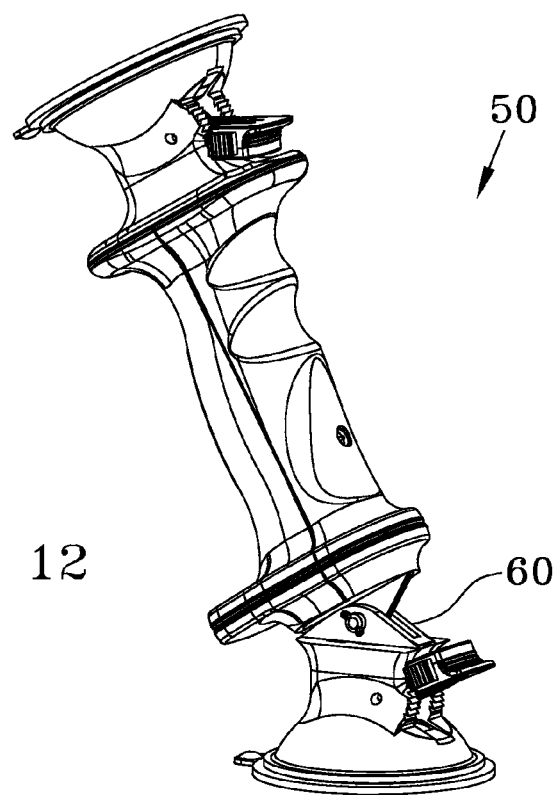
FIG. 12 is a perspective view of the second embodiment of the handheld mount assembly of the present invention.

Grip assembly 12 further includes a battery compartment 30 as is illustrated in FIG. 11. Battery compartment 30 is designed to house a battery or batteries having sufficient power to power the electronic device to which first embodiment mount assembly 10 is attached or any peripheral add-ons to mount 10 such as wirelessly connected speakers, lights, etc. Additionally the battery can serve as a reserve power for other devices. Second electrical terminal 39 is visible in FIG. 11 and allows an electronic device to be connected to mount 10 via an appropriate electronic connector as illustrated in FIG. 1-2. Battery compartment 30 can be covered with removable battery plate 32. Plate 32 includes a flexible cleat 33, which matingly engages detent 31 of compartment 30, allowing plate 32 to lock over battery compartment 30, covering and protecting the battery housed within compartment 30.

Looking at FIGS. 8 & 9 it can be seen that above and extending therefrom rear upper extension 16 is suction cup assembly 20, which comprises a domed base 22, lever 24, and flexible polymer disk 26. Suction cup assembly 20 is capable of securing to any planar, smooth surface such as the back of multimedia devices as illustrated in FIGS. 1 & 2, or in an alternate use, could be secured to the back of dinner plate or server's tray to provide an alternate and more ergonomic method of caring serving plates and trays, or even hard surface construction material such as laminate, plastic, and glass, to aid in installation. The vacuum grip provided by the suction cup assembly 20 is well know in the industry, but generally, the flexible polymer disk 26 is positioned on the back of the device that is to be secured/mounted. Lever 24 is connected to one end of a fulcrum that is connected at its other end to the bottom face of the center of disk 26. The fulcrum pivots about pivot pin 19, such that when lever 24 is vertically raised the end of the fulcrum connected to the bottom face of disk 26 is drawn downward so as to cause the upper face of disk 26 to form a concave depression, forming the vacuum seal discussed above. A ratchet locking mechanism is mechanically situated between lever 24 and domed base 22 and utilizes ratchet-lock teeth 23 (See FIG. 6). On lever 24 is at least one release button 21 that mechanically disengages lever 24 from teeth 23. The ratchet lock device allows the vertical position of the lever 24 to be secured corresponding to different degrees of concavity achieved on the upper face of flexible disk 26. In this manner the strength the vacuum may be adjusted for vary weights, creating an adjustable vacuum grip (stronger or lighter suction grip) depending on need. Additionally, the flexible polymer of the present invention does not require the surface (back of the multi-media device, for example) to be initially moistened. A small tab 27 of flexible polymer 26 extends beyond domed base 22 allowing the user to break the vacuum seal. Suction cup assembly 20 is mechanically affixed to grip assembly 12 at their respective mating physical interfaces.

Figures 3, 4:
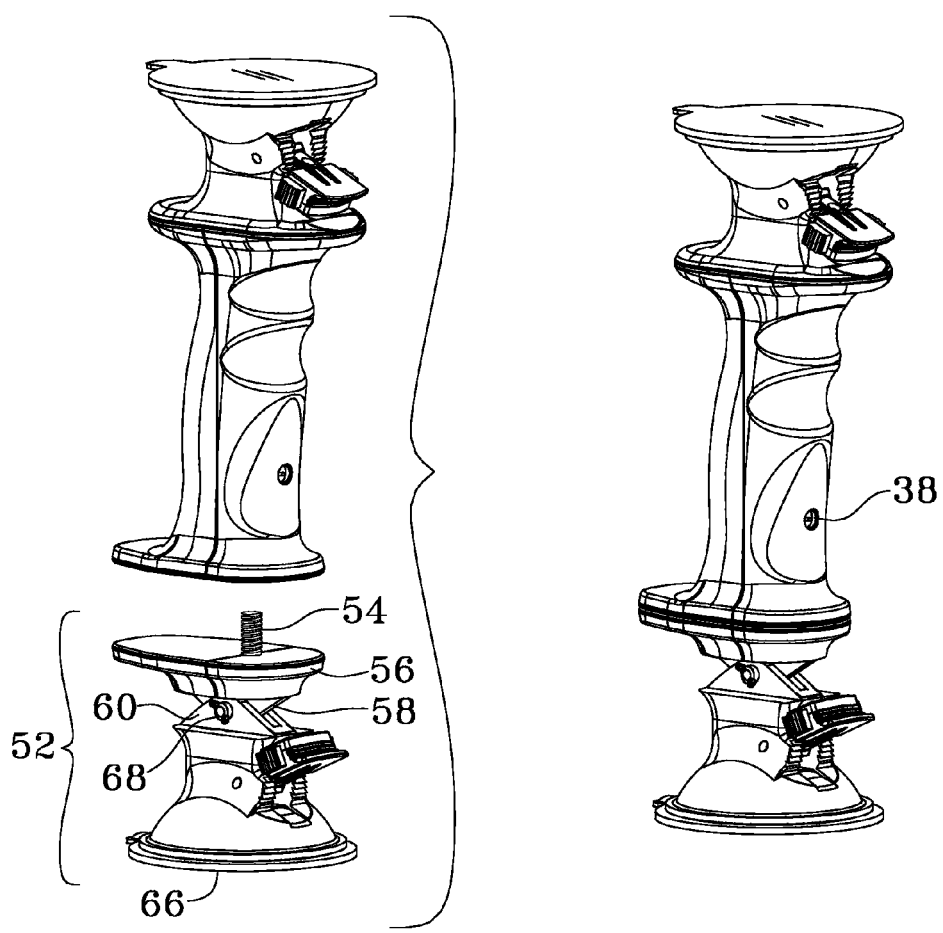
FIG. 3 is an exploded perspective view of a second embodiment of the handheld mount assembly of the present invention.
FIG. 4 is a perspective view of a second embodiment of the handheld mount assembly of the present invention.

Turning to FIGS. 1-4 and 12, second embodiment handheld mount assembly 50 can be seen. Second embodiment 50 connects first embodiment handheld mount 10 to a pivotal suction cup mount 52, as is illustrated in FIG. 3. Suction cup mount 52 is substantially similar in design and function to that of suction cup assembly 20 but additionally has a first pivotal connection member 60 extending therefrom. It further comprises a mounting plate 56 with a ¼" treaded connector 54 extending from a top face thereof and a second pivotal connection member 58 extending from a lower face thereof. Pivot pin 68 pivotally connects first pivotal connection member 60 to second pivotal connection member 58 so as to allow pivotal motion of the suction cup 66 with respect to grip assembly 12, when suction cup mount 52 is threadingly engaged by threaded connector 54 to connection orifice 28. Suction cup mount 52 is just an example of any number of pivotal or stationary mounts that could be attached to mount assembly 10. For example, mounting plate 56 could be configured to house a ball head making mount assembly 10 pivotal about the ball head.

Numerous additions while not illustrated could easily be added to mount assembly 10 without departing from the scope of the invention. For example, mount assembly 10 could easily be enabled for wireless transmission such as Wi-Fi, Bluetooth, 4G including LTE, Wibro Evolution (3.9G), LTE-Advanced, or otherwise enabled for wireless transmission of data or audio signals to devices. An input device such as a mouse could be incorporated within mount assembly 10 and communicate wirelessly with any tablet/pad computer, e-reader, or smart phone devices to which mount assembly 10 as been secured, or streamed to another electronic device within close proximity to mount assembly 10. A speaker could be incorporated into mount assembly 10 to play music or audio files from any electronic device to which mount assembly is secured. Additionally, numerous attachments To use the suction cup assembly 20 of the handheld mount assembly for portable electronic devices 10 is pressed against planar, flat surface of the back (non-viewing side) of a portable multi-media device, an the lever 24 is actuated, tightening the flexible polymer disk 26 and securing mount 10 via a vacuum grip. Once secured, the user is free to hold or carry his multi-media device via the mount assembly 10.

Although specific embodiments have been illustrated and described herein, it will be appreciated by those of ordinary skill in the art that a wide variety of alternate and/or equivalent implementations calculated to achieve the same purposes may be substituted for the specific embodiments shown and described without departing from the scope of the present invention. Therefore, it is intended that this invention be limited only by the claims and the equivalents thereof.

I claim:

1. A handheld mount and stand assembly comprising:
   a pistol grip assembly, wherein said pistol grip assembly includes a battery compartment therein, and comprises a flat base with a recessed connection orifice therein, and finger grooves, and a rear upper extension; and
   a suction cup assembly extending from said rear upper extension and adapted for secure attachment with a smooth planar surface, and wherein said suction cup assembly is mechanically affixed to said grip assembly.

2. The handheld mount and stand assembly of claim 1 wherein said suction cup assembly comprises a domed base, a lever, and a flexible polymer disk;
   wherein when said lever is vertically raised it draws a bottom face of said disk downward so as to cause an upper face of said disk to form a concave depression.

3. The handheld mount and stand assembly of claim 2 wherein said flexible polymer disk includes a small tab of flexible polymer extending beyond said domed base.

4. The handheld mount and stand assembly of claim 2 wherein said suction cup assembly further comprises a ratchet locking mechanism mechanically situated between said lever and said domed base;
   wherein said ratchet locking mechanism mechanically engages a series of ratchet-lock teeth, allowing the vertical position of the said lever to be altered.

5. The handheld mount and stand assembly of claim 4 wherein said lever further includes a button for mechanical disengagement of said lever from said ratchet-lock teeth.

6. The handheld mount and stand assembly of claim 1 wherein said grip assembly further includes least two electrical terminals for electrical connection with external connectors.

7. A handheld mount and stand assembly comprising:
   a pistol grip assembly, wherein said pistol grip assembly comprises a flat base with a recessed connection orifice therein, finger grooves, and a rear upper extension; and a suction cup assembly extending from said rear upper extension comprising a domed base, a lever, and a flexible polymer disk and adapted for secure attachment with a smooth planar surface, and wherein said suction cup assembly is mechanically affixed to said grip assembly;

a suction cup mount mechanically affixed to and extending from said flat base, a ratchet locking mechanism; and a mounting plate;

wherein said lever is mechanically connected to said disk such that when said lever is vertically raised the bottom face of said disk is drawn downward so as to cause an upper face of said disk to form a concave depression; and wherein said ratchet locking mechanism is mechanically situated between said lever and said domed base, said ratchet locking mechanism mechanically engages a series of ratchet-lock teeth, allowing the vertical position of the said lever to be altered; and wherein said lever further includes a button for mechanical disengagement of said lever from said ratchet-lock teeth; and wherein said suction cup mount comprises a first pivotal connection member extending from a bottom face thereof; and wherein said mounting plate comprises a second pivotal connection member extending from a lower face thereof, and further comprises a threaded connector extending from a top face thereof; and wherein said second pivotal connection member is designed for mating engagement with said first pivotal connection member and said threaded connector is designed for mating engagement with said connection orifice.

8. The handheld mount and stand assembly of claim 7 wherein a pivot pin pivotally connects said first pivotal connection member to said second pivotal connection member so as to allow pivotal motion of said suction cup mount with respect to said grip assembly when said suction cup mount is threadingly engaged by said threaded connector to said connection orifice.

* * * * *